United States Patent
Wang et al.

(10) Patent No.: US 10,819,907 B2
(45) Date of Patent: Oct. 27, 2020

(54) METHOD AND APPARATUS FOR SIGNALING SPHERICAL REGION INFORMATION IN ISOBMFF

(71) Applicant: MEDIATEK INC., Hsin-Chu (TW)

(72) Inventors: Xin Wang, San Jose, CA (US); Lulin Chen, San Jose, CA (US); Wang Lin Lai, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/498,397

(22) PCT Filed: Mar. 29, 2018

(86) PCT No.: PCT/CN2018/081114
§ 371 (c)(1),
(2) Date: Sep. 27, 2019

(87) PCT Pub. No.: WO2018/177373
PCT Pub. Date: Oct. 4, 2018

(65) Prior Publication Data
US 2020/0053282 A1     Feb. 13, 2020

Related U.S. Application Data

(60) Provisional application No. 62/478,676, filed on Mar. 30, 2017.

(51) Int. Cl.
*H04N 5/232*       (2006.01)
*H04N 13/178*    (2018.01)
(Continued)

(52) U.S. Cl.
CPC ....... *H04N 5/23238* (2013.01); *H04N 13/139* (2018.05); *H04N 13/178* (2018.05);
(Continued)

(58) Field of Classification Search
CPC ............ H04N 5/23238; H04N 13/178; H04N 13/139; H04N 21/234345; H04N 21/236;
(Continued)

(56) References Cited

U.S. PATENT DOCUMENTS

| 9,363,535 | B2 * | 6/2016 | Chen | ...................... H04N 19/50 |
| 10,244,257 | B2 * | 3/2019 | Hannuksela | ........... H04N 19/70 |

(Continued)

FOREIGN PATENT DOCUMENTS

| CN | 104685894 A | 6/2015 |
| CN | 106233745 A | 12/2016 |
| CN | 106331732 A | 1/2017 |

OTHER PUBLICATIONS

"International Search Report" dated Jun. 28, 2018 for International application No. PCT/CN2018/081114, International filing date: Mar. 29, 2018.

*Primary Examiner* — Thai Q Tran
*Assistant Examiner* — Syed Y Hasan
(74) *Attorney, Agent, or Firm* — Winston Hsu

(57) ABSTRACT

A video processing method includes receiving a virtual reality (VR) content, encoding visual data obtained from the VR content to generate a part of a coded bitstream, and encapsulating the part of the coded bitstream into ISO Base Media File Format (ISOBMFF) file (s). In one exemplary implementation, the ISOBMFF file (s) may include a timed metadata track associated with a sphere visual track, where the timed metadata track is set to signal that the associated sphere visual track contains at least one spherical region contributed from at least one region visual track. In another exemplary implementation, the ISOBMFF file (s) may include a timed metadata track associated with a region visual track, where the timed metadata track is set to signal that the associated region visual track contributes to at least (Continued)

one spherical region carried in at least one sphere visual track. Further, an associated video processing apparatus is provided.

17 Claims, 11 Drawing Sheets

(51) Int. Cl.
    *H04N 13/139*     (2018.01)
    *H04N 21/234*     (2011.01)
    *H04N 21/236*     (2011.01)
    *H04N 21/81*     (2011.01)
    *H04N 21/2343*     (2011.01)
    *H04N 21/2362*     (2011.01)
    *H04N 21/2365*     (2011.01)

(52) U.S. Cl.
    CPC ... *H04N 21/236* (2013.01); *H04N 21/234345* (2013.01); *H04N 21/816* (2013.01); *H04N 21/2362* (2013.01); *H04N 21/2365* (2013.01)

(58) Field of Classification Search
    CPC ............. H04N 21/816; H04N 21/2362; H04N 21/2365
    USPC .......................................................... 348/36
    See application file for complete search history.

(56) References Cited

U.S. PATENT DOCUMENTS

| | | |
|---|---|---|
| 2015/0074129 A1 | 3/2015 | Friedrich |
| 2016/0142697 A1 | 5/2016 | Budagavi |
| 2016/0352791 A1 | 12/2016 | Adams |
| 2017/0201752 A1* | 7/2017 | Wang ................... H04N 19/137 |
| 2017/0324951 A1* | 11/2017 | Raveendran ....... G02B 27/0093 |
| 2017/0339392 A1* | 11/2017 | Forutanpour ...... H04N 5/23238 |
| 2017/0347026 A1* | 11/2017 | Hannuksela ............ H04L 67/02 |
| 2018/0091815 A1* | 3/2018 | Banerjee ................ H04N 19/70 |

* cited by examiner

| trak (spherical video v) | mdat (spherical video samples, vs) |
| trak (spherical region metadata, m) | mdat (spherical region metadata samples, ms = "vs has a region defined by rosp") |

FIG. 4

METHOD AND APPARATUS FOR SIGNALING SPHERICAL REGION INFORMATION IN ISOBMFF

CROSS REFERENCE TO RELATED APPLICATIONS

This application claims the benefit of U.S. provisional application No. 62/478,676 filed Mar. 30, 2017, which is incorporated herein by reference.

FIELD OF INVENTION

The present invention relates to processing virtual reality (VR) content, and more particularly, to a method and an apparatus for signaling spherical region information in the ISO Base Media File Format (ISOBMFF).

BACKGROUND OF THE INVENTION

Virtual reality (VR) has lately gained significant attention primarily driven by the recent market availability of consumer devices, such as head-mounted displays (HMDs). VR with HMDs is associated with a variety of applications. The ability to show wide field of view content to a user can be used to provide immersive visual experiences. A real-world environment has to be captured in all directions, resulting in an omnidirectional VR content. With advances in camera rigs and HMDs, the delivery of omnidirectional VR content may soon become the bottleneck due to the high bitrate required for representing such 360° content.

In recent years, there have been a lot of activities around VR as evidenced by large industry engagement. For example, due to expecting that the increasing popularity of consumer VR HMDs will lead to an increased demand for VR content, various companies have also started to develop omnidirectional cameras to allow capturing of 360° content. However, the lack of appropriate standards and, consequently, reduced interoperability is becoming an issue. Thus, Moving Picture Experts Group (MPEG) has started a project referred to as Omnidirectional Media Application Format (OMAF) that aims at standardizing a storage and delivery format for 360° audio-video content. In the context of OMAF, the storage and delivery format is based on the ISO base media file format (ISOBMFF). However, regarding the developing standard for VR content storage and delivery, there is much room for improvement.

SUMMARY OF THE INVENTION

One of the objectives of the claimed invention is to provide a method and an apparatus for signaling spherical region information in the ISO Base Media File Format (ISOBMFF).

According to a first aspect of the present invention, an exemplary video processing method is disclosed. The exemplary video processing method includes: receiving a virtual reality (VR) content; encoding visual data obtained from the VR content to generate a part of a coded bitstream; and encapsulating, by a file encapsulation circuit, the part of the coded bitstream into at least one ISO Base Media File Format (ISOBMFF) file, wherein said at least one ISOBMFF file comprises a timed metadata track associated with a sphere visual track, and the timed metadata track is set to signal that the associated sphere visual track contains at least one spherical region contributed from at least one region visual track.

According to a second aspect of the present invention, an exemplary video processing method is disclosed. The exemplary video processing method includes: receiving a virtual reality (VR) content; encoding visual data obtained from the VR content to generate a part of a coded bitstream; and encapsulating, by a file encapsulation circuit, the part of the coded bitstream into at least one ISO Base Media File Format (ISOBMFF) file, wherein said at least one ISOBMFF file comprises a timed metadata track associated with a region visual track, and the timed metadata track is set to signal that the associated region visual track contributes to at least one spherical region carried in at least one sphere visual track.

According to a third aspect of the present invention, an exemplary video processing method is disclosed. The exemplary video processing method includes: receiving at least one ISO Base Media File Format (ISOBMFF) file, wherein virtual reality (VR) content is delivered by said at least one ISOBMFF file, said at least one ISOBMFF file comprises a timed metadata track associated with a sphere visual track, and the timed metadata track signals that the associated sphere visual track contains at least one spherical region contributed from at least one region visual track; decapsulating said at least one ISOBMFF file to obtain a part of a coded bitstream and metadata signaled by the timed metadata track; decoding the part of the coded bitstream according to the metadata; and driving a display screen according to a decoding result of the part of the coded bitstream.

According to a fourth aspect of the present invention, an exemplary video processing method is disclosed. The exemplary video processing method includes: receiving at least one ISO Base Media File Format (ISOBMFF) file, wherein virtual reality (VR) content is delivered by said at least one ISOBMFF file, said at least one ISOBMFF file comprises a timed metadata track associated with a region visual track, and the timed metadata track signals that the associated region visual track contributes to at least one spherical region carried in at least one sphere visual track; decapsulating said at least one ISOBMFF file to obtain a part of a coded bitstream and metadata signaled by the timed metadata track; decoding the part of the coded bitstream according to the metadata; and driving a display screen according to a decoding result of the part of the coded bitstream.

In addition, video processing apparatuses associated with the above video processing methods are provided.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating association between a main sphere visual track and a spherical region metadata track according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
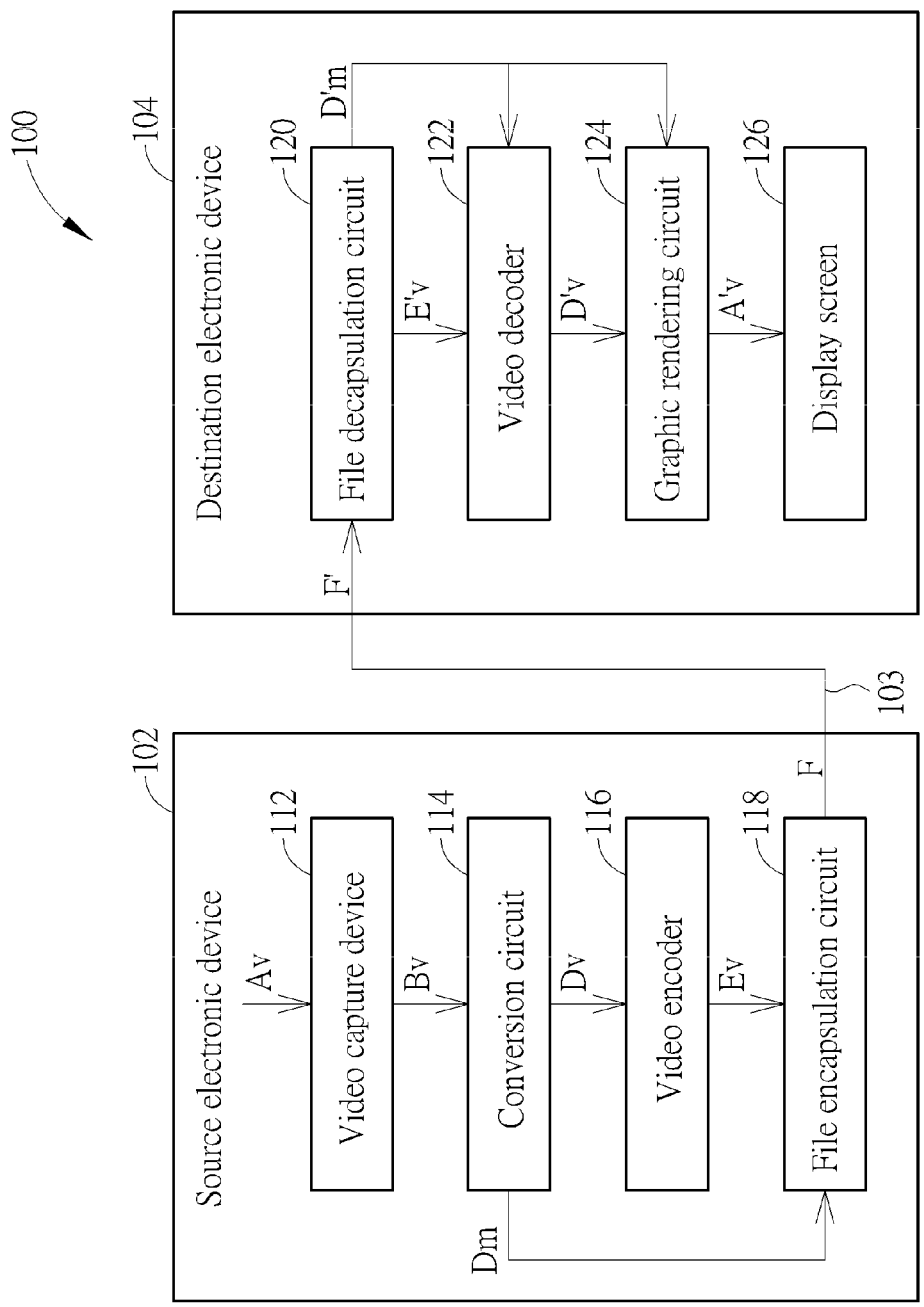
FIG. 1 is a diagram illustrating a Virtual Reality (VR) system according to an embodiment of the present invention.

FIG. 1 is a diagram illustrating a Virtual Reality (VR) system according to an embodiment of the present invention. The VR system 100 includes two video processing apparatuses (e.g., a source electronic device 102 and a destination electronic device 104). The source electronic device 102 includes a video capture device 112, a conversion circuit 114, a video encoder 116, and a file encapsulation circuit 118. The video capture device 112 is a VR content provider that provides a VR content (e.g., an omnidirectional VR content) Bv. For example, the video capture device 112 may be a set of cameras used to capture a scene Av in different directions, such that multiple captured images that cover the whole surroundings are generated by the video capture device 112. In some other embodiments, multiple captured images that cover the whole surroundings may be received from more than one source devices, more than one video capture device or a combination of at least one source device and at least one video capture device. In this embodiment, the video capture device 112 may be equipped with video stitching capability. Hence, the contents captured by different cameras of the video capture device 112 may be stitched together to form a stitched image. In addition, the stitched image may be further projected onto a three-dimensional (3D) projection structure (e.g., a sphere). Hence, the video capture device 112 can provide the VR content Bv on a sphere.

The conversion circuit 114 is coupled between the video capture device 112 and the video encoder 116. The conversion circuit 114 generates a picture Dv on a two-dimensional (2D) plane by applying visual pre-processing to the VR content Bv in a 3D space. When the VR content Bv corresponds to a sphere in the 3D space, the visual pre-processing performed at the conversion circuit 114 may include projection and optional region-wise packing. Hence, the picture Dv may be a projected picture when the optional region-wise packing is not applied to the projected picture, or may be a packed picture when the optional region-wise packing is applied to the projected picture. The VR content Bv on the 3D projection structure (e.g., sphere) may be further arranged onto a 2D projected picture via a 360° VR projection format. For example, the 360° VR projection format may be an equirectangular projection (ERP) format or a cubemap projection (CMP) format. Assuming that the optional region-wise packing is used, regions on the 2D projected picture are further mapped onto a 2D packed picture. The region-wise packing process may be applied to a projected picture with a particular projection layout (e.g., an ERP layout or a compact CMP layout) prior to encoding. For example, the projected picture is partitioned into a plurality of rectangular regions, and the region-wise packing is applied to the rectangular regions for packing the rectangular regions into a packed picture. Regarding a rectangular region of the projected picture, the region-wise packing may apply translation, scaling, rotation, and/or mirroring to the rectangular region before packing the rectangular region into the packed picture.

The picture Dv may be one video frame included in a sequence of video frames generated from the conversion circuit 114. The video encoder 116 is an encoding circuit used to encode/compress the picture Dv to generate a part of a coded bitstream. After receiving the part of the coded bitstream (which includes encoded data Ev of the picture Dv) from the video encoder 116, the file encapsulation circuit 118 encapsulates the part of the coded bitstream into one or more ISOBMFF files F together with additional metadata Dm. For example, the additional metadata Dm may provide additional signaling for dynamic adaptive streaming over HTTP (DASH).

In some embodiments of the present invention, a viewport-dependent streaming scheme (e.g., a tile-based or sub-picture-based streaming scheme) may be employed for 360° video delivery. In accordance with the tile-based streaming scheme, the picture Dv is partitioned into a plurality of tiles (or sub-pictures), each being independently coded. In other words, a tile of the picture Dv is a spatial portion (i.e., a sub-picture) of the picture Dv, and is generally in a rectangular shape. Further, the content of the same tile can be coded in different qualities and bit rates to generate variants of the encoded tile, or can be coded in different codecs and protection schemes to generate variants of the encoded tile. In this case, each of the ISOBMFF files F is a tile-based file. The file encapsulation circuit 118 encapsulates each of the encoding variants of the same tile into a variant track (i.e., a variant sub-picture track), and encapsulates variant tracks of all encoding variants of the same tile into the same ISOBMFF file F. The metadata Dm may include metadata directly placed in a visual track by using a track metadata box, and/or may include metadata placed in a metadata track (e.g., timed metadata track) associated with the visual track. For example, the signaled metadata Dm may include projection/orientation information, packing information, sub-picture composition information, region of interest (ROI) information, viewport information, etc.

Alternatively, the picture Dv may be directly set by the VR content Bv on a sphere. Hence, after receiving the part of the coded bitstream (which includes encoded data Ev of the picture Dv) from the video encoder 116, the file encapsulation circuit 118 encapsulates the part of the coded bitstream into one or more ISOBMFF files F together with additional metadata Dm, where a sphere visual track (i.e., VR 3D video track) is included in the ISOBMFF files F, and spherical region visual tracks (i.e., region 3D video track) are included in the ISOBMFF files F. However, this is for illustrative purposes only, and is not meant to be a limitation of the present invention. That is, in some embodiments of the present invention, signaling of the sphere video track (i.e., VR 3D video track) may be omitted. For example, the sphere video track (i.e., VR 3D video track) may be a derived track obtained from track derivation performed at a VR application end (i.e., destination electronic device 104).

The file encapsulation circuit 118 outputs the ISOBMFF files F to the destination electronic device 104 via a transmission means 103. For example, the transmission means 103 may be a wired/wireless communication link, and the ISOBMFF files F are delivered to the destination electronic device 104 over HTTP using unicast, multicast or broadcast delivery.

The destination electronic device 104 may be a head-mounted display (HMD) device. As shown in FIG. 1, the destination electronic device 104 includes a file decapsulation circuit 120, a video decoder 122, a graphic rendering circuit 124, and a display screen 126. The file decapsulation circuit 120 receives ISOBMFF files F' from the transmission means 103. If there are no transmission errors, ISOBMFF files F' received by the file decapsulation circuit 120 should be the same as ISOBMFF files F output from the file encapsulation circuit 118. After receiving the ISOBMFF files F', the file decapsulation circuit 120 decapsulates the ISOBMFF files F' into a part of a coded bitstream (which includes an encoded data E'v of a picture to be reconstructed), and extracts/parses the accompanying metadata D'm from the ISOBMFF files F'. If there are no transmission errors and decapsulation errors, the metadata D'm extracted/parsed from the ISOBMFF files F' should be the same as the metadata Dm added to the ISOBMFF files F.

The video decoder 122 is coupled between the file decapsulation circuit 120 and the graphic rendering circuit 124, and is a decoding circuit arranged to decode the part of the coded bitstream according to the extracted/parsed metadata D'm. For example, the video decoder 122 decodes the part of the coded bitstream to obtain decoded data D'v of a spherical region on a sphere (e.g., a viewport or a region of interest) specified by the signaled metadata D'm. The graphic rendering circuit 124 is a post-processing circuit arranged to render and display the spherical region on the display screen 126 according to display data A'v obtained from the decoded data of the viewport. In other words, the graphic rendering circuit 124 drives the display screen 126 according to a decoding result of the part of the coded bitstream.

When a 3D sphere visual (especially video) content contains an ROI (Region of Interest) or a region intended for a viewport, the latest OMAF standard draft provides a spherical region definition in the ISO Base Media File Format (ISOBMFF), which can be carried in a timed metadata track, and associated with the sphere visual track, by means of a 'cdsc' (content describes) track reference.

Figure 2:
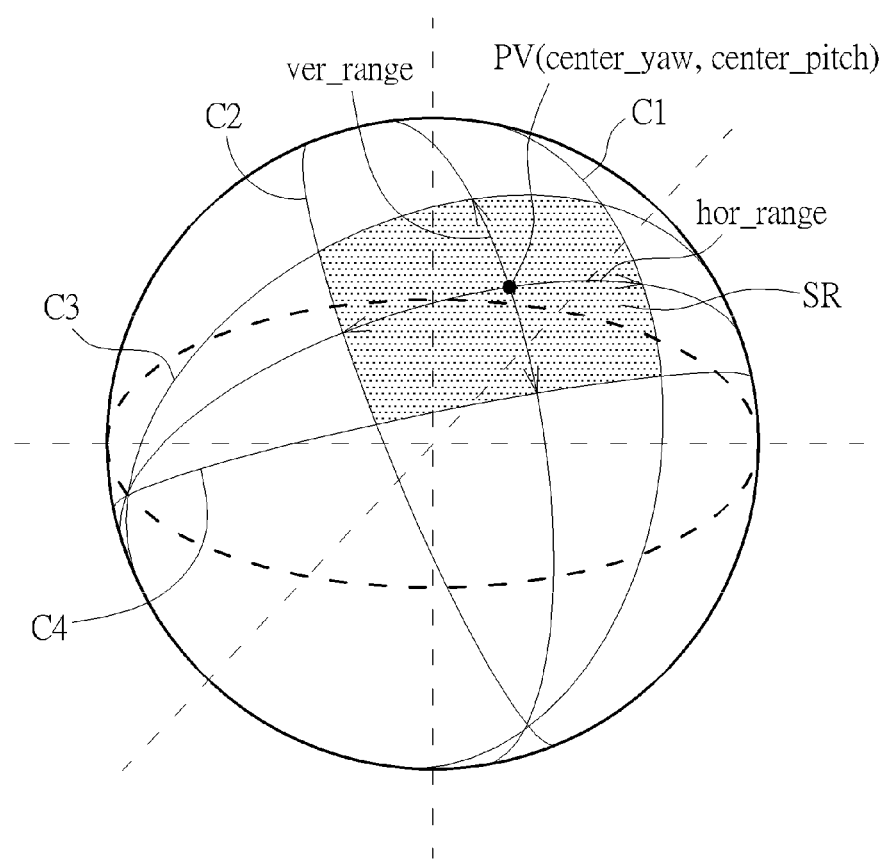
FIG. 2 is a diagram illustrating a first shape type of a spherical region on a sphere according to an embodiment of the present invention.

For spherical region (e.g., ROI or viewport) signaling, at least two shape types are defined: one bounded by four great circles, and the other bounded by two yaw circles and two pitch circles. FIG. 2 is a diagram illustrating a first shape type of a spherical region SR on a sphere according to an embodiment of the present invention. The ISOBMFF files F generated from the file encapsulation circuit 118 at a VR service provider end (i.e., source electronic device 102) include at least a first parameter center_yaw and a second parameter center_pitch associated with orientation of the spherical region SR on a sphere, with the first parameter center_yaw and the second parameter center_pitch indicating a yaw angle and a pitch angle of a center PV of the spherical region SR, respectively. In other words, the first parameter center_yaw and the second parameter center_pitch decide the spherical coordinates of the spherical region SR. The first parameter center_yaw and the second parameter center_pitch are signaled to the VR application end (i.e., destination electronic device 104). After the ISOBMFF files F' are received by the file decapsulation circuit 120 at the VR application end (i.e., destination electronic device 104), the first parameter center_yaw and the second parameter center_pitch are extracted/parsed from the ISOBMFF files F' to indicate the center PV of the spherical region SR.

Further, the ISOBMFF files F generated from the file encapsulation circuit 118 at the VR service provider end (i.e., source electronic device 102) may also include at least a fourth parameter hor_range and a fifth parameter ver_range associated with the spherical region SR on a sphere, where the fourth parameter hor_range indicates a horizontal range of the spherical region SR, and the fifth parameter ver_range indicates a vertical range of the spherical region SR. In other words, the fourth parameter hor_range and the fifth parameter ver_range decide the horizontal and vertical sizes (i.e., coverage) of the spherical region SR. The fourth parameter hor_range and the fifth parameter ver_range are also signaled to the VR application end (i.e., destination electronic device 104). After the ISOBMFF files F' are received by the file decapsulation circuit 120 at the VR application end (i.e., destination electronic device 104), the fourth parameter hor_range and the fifth parameter ver_range are extracted/parsed from the ISOBMFF files F' to indicate a horizontal range and a vertical range of the spherical region SR, respectively. As shown in FIG. 2, the boundaries of the spherical region SR are decided by four great circles C1, C2, C3, and C4, each of which intersects the sphere and is on a plane passing through a center of the sphere.

Figure 3:
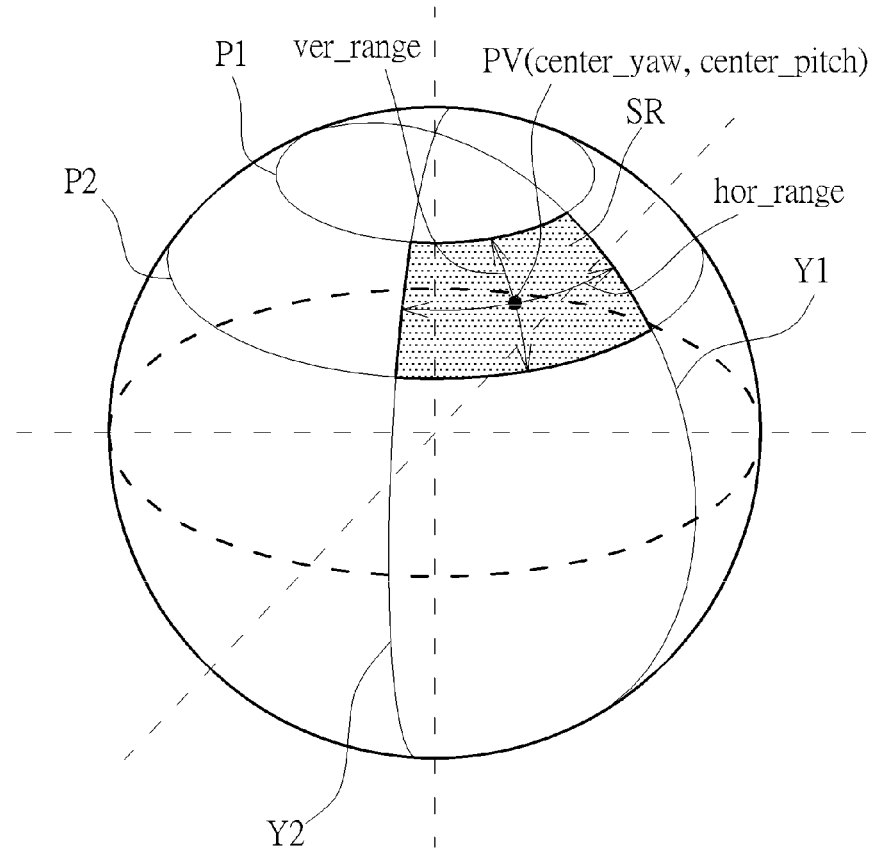
FIG. 3 is a diagram illustrating a second shape type of a spherical region on a sphere according to an embodiment of the present invention.

FIG. 3 is a diagram illustrating a second shape type of a spherical region SR on a sphere according to an embodiment of the present invention. The boundaries of the spherical region SR are decided by two yaw circles Y1 and Y2 and two pitch circles P1 and P2. Each yaw circle is a circle on the sphere that connects all points with the same yaw angle value. Each pitch circle is a circle on the sphere that connects all points with the same pitch angle value.

Specifically, the spherical region definition has the following sample entry syntax:

```
class RegionOnSphereSampleEntry extends
MetaDataSampleEntry('rosp') {
    RegionOnSphereConfigBox( ); // mandatory
    Box[ ] other_boxes; // optional
}
```

-continued

```
class RegionOnSphereConfigBox extends FullBox('rosc', version =
0, flags) {
    unsigned int(8) shape_type;
    bit(7) reserved = 0;
    unsigned int(1) dynamic_range_flag;
    if (dynamic_range_flag == 0) {
        unsigned int(16) static_hor_range;
        unsigned int(16) static_ver_range;
    }
    unsigned int(16) num_regions;
}
``` and the following sample syntax:

```
aligned(8) RegionOnSphereStruct(range_included_flag) {
    signed int(16) center_yaw;
    signed int(16) center_pitch;
    if (range_included_flag) {
        unsigned int(16) hor_range;
        unsigned int(16) ver_range;
    }
}
aligned(8) RegionOnSphereSample( ) {
    for (i = 0; i < num_regions; i++)
        RegionOnSphereStruct(dynamic_range_flag)
}
```

FIG. 4 is a diagram illustrating association between a main sphere visual track and a spherical region metadata track according to an embodiment of the present invention. For example, the ISOBMFF files F/F' may include an existing sphere visual track (which is contained in a track box of type 'trak') v with a media content (which is contained in a data box of type 'mdat') vs. In addition, the ISOBMFF files F/F' may further include a spherical region metadata track (which is contained in a track box of type 'trak') m with a media content (which is contained in a data box of type 'mdat') ms. The spherical region metadata track m may be a timed metadata track, and can be associated with or can make reference to the existing visual track v to provide metadata about the media content in the existing sphere visual track v.

However, using this mechanism, one can only signal that the main sphere visual sample in the referenced visual track v contains a spherical region specified by the spherical region definition (sample entry and sample) in the timed metadata track m. When the spherical region content exists and is carried in other n (n≥1) visual tracks, this mechanism does not specify how the main sphere visual track v is associated with the other spherical region carrying visual tracks, as the spherical region metadata track m merely signals that the sphere visual track v has a spherical region defined in the spherical region metadata track m.

Moreover, there is no timed metadata defined in the latest OMAF standard draft for spherical regions that can be associated with their visual tracks, and used to indicate how they are related to the regions signalled in the metadata for the sphere visual track.

To address above issues, the present invention provides methods for signaling associations of sphere visual tracks and their spherical region carrying or contributing (spherical or 2D projected) region visual tracks in ISOBMFF for OMAF, in order to enhance the OMAF standard to support more ROI and viewport related use cases and requirements.

More specifically, when there are (spherical or 2D projected) region visual tracks, $v_1, \ldots, v_n$, n≥0, that carrying or contribute to content of spherical regions, $R_1, \ldots, R_k$, k≥1, in a (main) sphere visual track v, the present invention provides effective mechanisms to signal in the following situations where the referenced visual track is either the sphere track v containing the spherical regions, or a region visual track $v_i$, 1≤i≤n, contributing to the spherical regions:

1. A sphere visual content containing a single spherical region: the timed metadata track m signals that the referenced (main) sphere visual track v contains a spherical region defined by its spherical coordinates and sizes, identified by a spherical region identifier id, and contributed by (or carried in) the region visual tracks $v_1, \ldots, v_n$. For signaling containment of multiple spherical regions, this relies on using multiple timed metadata tracks to be associated with the sphere visual track.

2. A sphere visual content containing multiple spherical regions: the timed metadata track m signals that the referenced (main) sphere visual track v contains a number of spherical regions, each of which is defined by its spherical coordinates and sizes, identified by a spherical region identifier id, and carried in a number of region visual tracks $v_1, \ldots, v_n$.

3. A region visual content contributing to a single spherical region: the timed metadata track m' signals that the referenced region visual track v' contributes to a spherical region, identified by a spherical region identifier id, of a (main) visual track v, and the contribution portion from v' is defined by the spherical coordinates and sizes of both the spherical region and the track v' itself. For signaling contribution to multiple spherical regions, this relies on using multiple timed metadata tracks to be associated with the region visual track.

Note one could define spherical regions in terms of regions, in that any region is either entirely belonging to a spherical region or not contributing to the spherical region at all. In this case, the signaling of the contribution portion could be omitted. Also note that the main visual track v is signaled for the purposes of ensuring the uniqueness of, as well as easily locating, the spherical region that the region visual track contributes to. If the identification of the spherical region can be made unique and easily accessible, the signaling of the main visual track v can also be omitted.

4. A region visual content contributing to multiple spherical regions: the timed metadata track m' signals that the referenced region visual track v' contributes to a number of spherical regions, and for each contributed spherical region identified by an identifier id, of a (main) sphere visual track v, the contribution portion from v' is defined by the spherical coordinates and sizes of both the spherical region and the track v' itself.

The advantages of the present invention include feasible and two-way associations between spherical region containing (main) sphere visual tracks and spherical region contributing (region) visual tracks, through their respectively associated timed metadata tracks, so that easy access and switching can be achieved from one type of tracks to another, for the purposes like ROI/viewport processing, storing, delivering, annotating and rendering.

The present invention can also be used for signaling hierarchical spherical regions, where spherical regions can have their own (sub-)spherical regions. In those situations, a spherical region contributing region visual track can also be a spherical region containing main visual track, and one or more timed metadata tracks can be used to signal spherical regions it contributes to and one or more timed metadata tracks to signal spherical regions it contains.

The present invention also provides a different embodiment for defining spherical regions in its sample entry and sample syntaxes, which is more optimal and compact.

Additionally, this invention can be extended to include other shapes of spherical regions, such as circle, triangle, and square.

Note that the names of the sample entry types and the classes defined in this disclosure are illustrative, and their definitions can be optimized and made more compact, especially when some factors can be omitted, fixed and assumed as constant or time-invariant.

Further details of the proposed spherical region information signaling used in above-mentioned situations are described with reference to the accompanying drawings.

Figure 5:
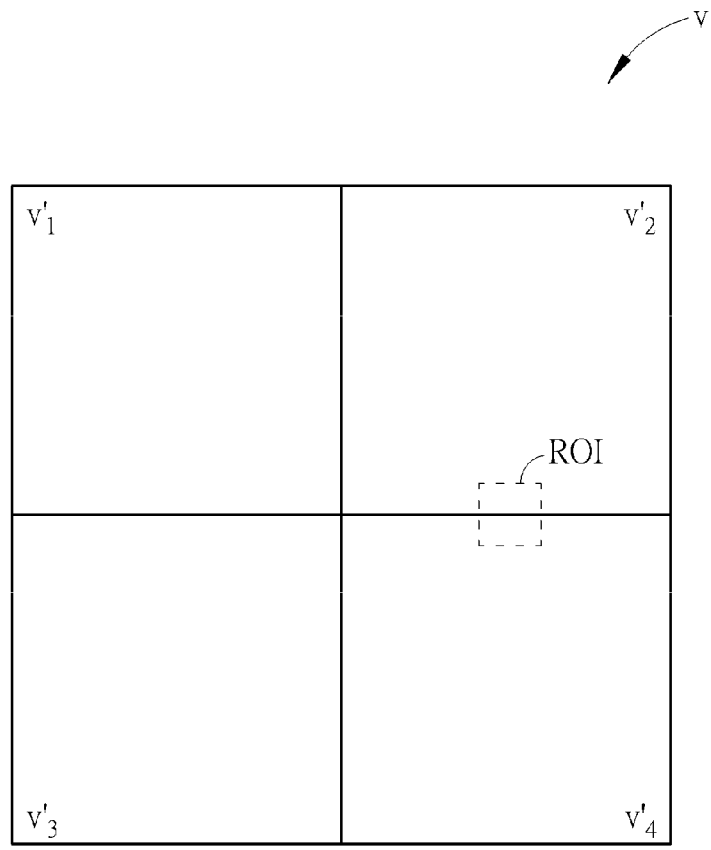
FIG. 5 is a diagram illustrating a single spherical region included in a sphere video content carried in a sphere visual track v according to an embodiment of the present invention.

FIG. 5 is a diagram illustrating a single spherical region included in a sphere video content carried in a sphere visual track according to an embodiment of the present invention. For clarity and simplicity, FIG. 5 shows a rectangular projected picture of the sphere video content on a 2D plane. Actually, the sphere video content is on a sphere in a 3D space, and may have the shape projected from the sphere. As shown in FIG. 5, the sphere visual content carried in the sphere visual track v is also divided into a plurality of spherical sub-pictures that are carried in a plurality of region visual tracks $v'_1$, $v'_2$, $v'_3$, and $v'_4$, respectively. In this embodiment, the sphere visual track v contains only a single spherical region (denoted by "ROI"). Thus, the first situation mentioned above is met. It should be noted that the single spherical region may be an ROI or a viewport, depending upon the actual design considerations. For clarity and simplicity, the spherical region ROI has the shape of a rectangle. However, this is for illustrative purposes only, and is not meant to be a limitation of the present invention. As mentioned above, the spherical region ROI is defined by its spherical coordinates (e.g., center_yaw and center_pitch) and sizes (e.g., hor_range and ver_range) in a 3D space. In addition, the spherical region ROI may be bounded by four great circles (first shape type) as illustrated in FIG. 2, or may be bounded by two yaw circles and two pitch circles (second shape type) as illustrated in FIG. 3.

The present invention proposes that the ISOBMFF files F generated from the file encapsulation circuit 118 at the VR service provider end (i.e., source electronic device 102) include a timed metadata track associated with a sphere visual track, and the timed metadata track is set by the file encapsulation circuit 118 to signal that the associated sphere visual track contains only a single spherical region contributed from one or more region visual tracks identified or referenced by respective track identifiers. The timed metadata track is signaled to the VR application end (i.e., destination electronic device 104). After the ISOBMFF files F' are received by the file decapsulation circuit 120 at the VR application end (i.e., destination electronic device 104), the timed metadata track is decapsulated from the ISOBMFF files F' to obtain extracted/parsed metadata indicating that a single spherical region carried in the associated sphere visual track is contributed from one or more region visual tracks. The metadata signaled by the timed metadata track contain information needed by the following signal processing stages such as video decoder 122 and graphic rendering circuit 124. For example, the file decapsulation circuit 120 decapsulates the ISOBMFF files F' to obtain a part of a coded bitstream and metadata signaled by the timed metadata track. The video decoder 122 decodes the part of the coded bitstream according to at least the extracted/parsed metadata. Specifically, the video decoder 122 accesses and decodes encoded data of visual track(s) of a selected type according to at least the metadata signaled by the timed metadata track. The graphic rendering circuit 124 drives the display screen 126 according to a decoding result of the part of the coded bitstream.

Figure 6:
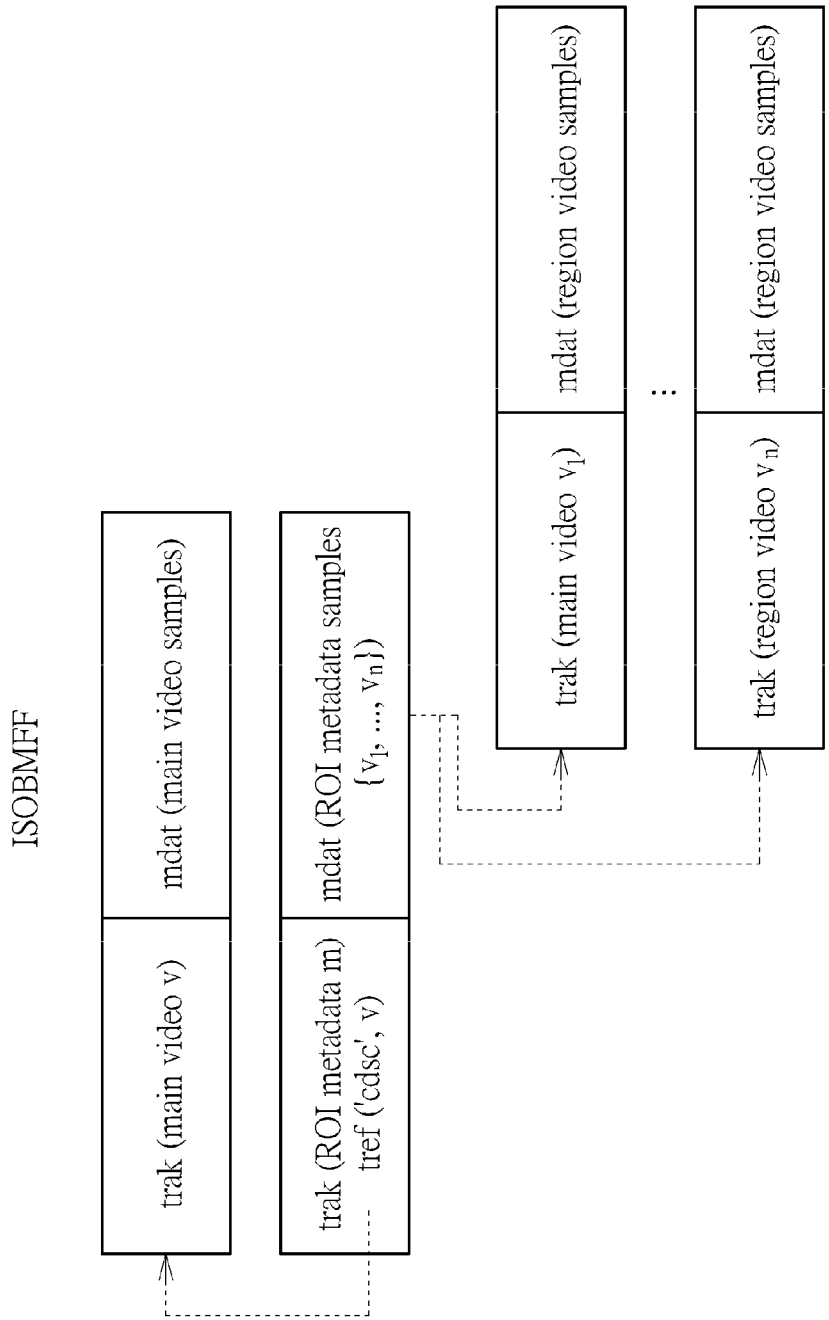
FIG. 6 is a diagram illustrating a timed metadata track that is associated with a sphere visual track and encapsulated in ISOBMFF according to an embodiment of the present invention.

FIG. 6 is a diagram illustrating a timed metadata track that is associated with a sphere visual track and encapsulated in ISOBMFF according to an embodiment of the present invention. The timed metadata track m signals that the referenced (main) sphere visual track v contains a spherical region defined by its spherical coordinates (e.g., center_yaw and center_pitch) and sizes (e.g., hor_ange and ver_range), identified by a unique spherical region identifier, and contributed by (or carried in) the region visual tracks $v_1, \ldots, v_n$ identified or referenced by track identifiers. That is, the timed metadata track m signals the spherical region identifier, spherical coordinates and sizes of a spherical region as well as track identifier(s) of region visual track(s). Taking the spherical region ROI shown in FIG. 5 for example, it is contributed by two region visual tracks $v'_2$ and $v'_4$. Hence, the region visual tracks $v_1, \ldots, v_n$ shown in FIG. 6 consist of $v'_2$ and $v'_4$ (i.e., $\{v_1, \ldots, v_n\} = \{v'_2, v'_4\}$).

Further details of the first situation in which a sphere visual content contains a single spherical region are provided as below.

1. Signaling for a Sphere Visual Track Containing a Single Spherical Region

An embodiment of the invention specifies timed metadata for signaling that a (main) sphere visual track contains a single spherical region and a number of (spherical or 2D projected) region visual tracks contribute to the spherical region. More specifically, a timed metadata track m signals that the referenced (main) sphere visual track v contains a spherical region defined by its spherical coordinates and sizes, identified by a spherical region identifier id, and carried in the region visual tracks $v_1, \ldots, v_n$.

1.1 Sample Entry 1.1.1 Syntax

```
class RegionOnSphereSampleEntry extends
MetaDataSampleEntry('rosp') {
    RegionOnSphereConfigBox( ); // mandatory
    Box[ ] other_boxes; // optional
}
class RegionOnSphereConfigBox extends FullBox('rosc', version =
0, flags) {
    unsigned int(8) shape_type;
    bit(7) reserved = 0;
    unsigned int(1) dynamic_range_flag;
    if (dynamic_range_flag == 0) {
        unsigned int(16) static_hor_range;
        unsigned int(16) static_ver_range;
    }
}
```

1.1.2 Semantics shape_type equal to 1 specifies that the region is specified by four great circles.

shape_type equal to 2 specifies that the region is specified by two yaw circles and two pitch circles.

shape_type values equal to 0 and greater than 1 are reserved.

dynamic_range_flag equal to 0 specifies that the horizontal and vertical ranges of the region remain unchanged in all samples referring to this sample entry. dynamic_range_flag equal to 1 specifies that the horizontal and vertical ranges of the region is indicated in the sample format.

static_hor_range and static_ver_range specify the horizontal and vertical ranges, respectively, of the region for each sample referring to this sample entry in units of 0.01 degrees. static_hor_range and static_ver_range specify the ranges through the center point of the region.

1.2 Sample Format 1.2.1 Syntax

```
aligned(8) RegionOnSphereSample( ) {
    unsigned int(16) sr_id;
    signed int(16) center_yaw;
    signed int(16) center_pitch;
    if (shape_type==1 || shape_type==2) {
        unsigned int(16) hor_range;
        unsigned int(16) ver_range;
        unsigned int(16) num_region_tracks;
        for (i = 1; i <= num_region_tracks; i++) {
            unsigned int(32) track_id;
        }
    }
}
```

The syntax can be enhanced further, as follows, to specify the portion of the spherical region that each contributing track contributes, with respect to the spherical coordinates and sizes of the spherical region.

```
aligned(8) RegionOnSphereSample( ) {
    unsigned int(16) sr_id;
    signed int(16) center_yaw;
    signed int(16) center_pitch;
    if (shape_type==1 || shape_type==2) {
        unsigned int(16) hor_range;
        unsigned int(16) ver_range;
        unsigned int(16)    num_region_tracks;
        for (i = 1; i <= num_region_tracks; i++) {
            unsigned int(32) track_id;
            unsigned int(16) region_portion_yaw;
            unsigned int(16) region_portion_pitch;
            unsigned int(16) portion_hor_range;
            unsigned int(16) portion_ver_range;
        }
    }
}
```

The syntax can be even further enhanced, as follows, to specify the portion of the spherical region that each contributing track contributes, with respect to the spherical coordinates and sizes of the contributing track itself.

```
aligned(8) RegionOnSphereSample( ) {
    unsigned int(16)    sr_id;
    signed int(16) center_yaw;
    signed int(16) center_pitch;
    if (shape_type==1 || shape_type==2) {
        unsigned int(16) hor_range;
        unsigned int(16) ver_range;
        unsigned int(16)    num_region_tracks;
        for (i = 1; i <= num_region_tracks; i++) {
            unsigned int(32) track_id;
            unsigned int(16) region_portion_yaw;
            unsigned int(16) region_portion_pitch;
            unsigned int(16) portion_hor_range;
            unsigned int(16) portion_ver_range;
            unsigned int(16) track_portion_yaw;
            unsigned int(16) track_portion_pitch;
        }
    }
}
```

1.2.2 Semantics sr_id specifies an identifier of the spherical region. Its value shall be unique with respect to any other spherical regions that the referenced track contains.

center_yaw and center_pitch specify the center point of the region specified in units of 0.01 degrees relative to the global coordinate system. center_yaw shall be in the range of −18000 to 17999, inclusive. center_pitch shall be in the range of −9000 to 9000, inclusive.

hor_range and ver_range, when present, specify the horizontal and vertical ranges, respectively, of the region specified in units of 0.01 degrees. hor_range and ver_range specify the range through the center point of the region.

num_region_tracks specifies the number of region visual tracks whose contents contribute to the spherical region. When it is equal to 0, this implies that there is no (possibly available or known) visual tracks, other than the referenced track containing the spherical region, contributing to it.

track_id specifies an identifier of a region visual track whose content contributes the spherical region. It shall not be equal to the identifier of the referenced (main) sphere visual track.

region_portion_yaw and region_portion_pitch specify the center point of the portion on the spherical region the contributing track of track_id is to contribute.

portion_hor_range and portion_ver_range specify the horizontal and vertical ranges, respectively, of the portion the contributing track of track_id is to contribute, specified in units of 0.01 degrees. portion_hor_range and portion_ver_ range specify the range through the center point of the portion.

track_portion_yaw and track_portion_pitch specify the center point of the portion on the region of the contributing track of track_id is to contribute.

Figure 7:
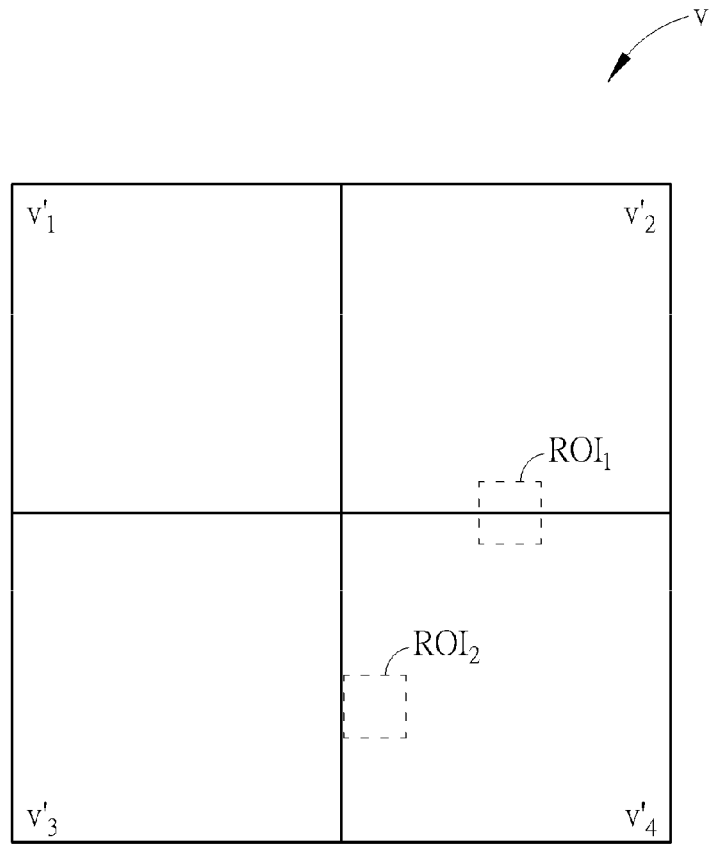
FIG. 7 is a diagram illustrating multiple spherical regions included in a sphere video content carried in a sphere visual track v according to an embodiment of the present invention.

FIG. 7 is a diagram illustrating multiple spherical regions included in a sphere video content carried in a sphere visual track according to an embodiment of the present invention. For clarity and simplicity, FIG. 7 shows a rectangular projected picture of the sphere video content on a 2D plane. Actually, the sphere video content is on a sphere in a 3D space, and may have the shape projected from the sphere. As shown in FIG. 7, the sphere visual content carried in the sphere visual track v is also divided into a plurality of spherical sub-pictures that are carried in a plurality of region visual tracks $v'_1$, $v'_2$, $v'_3$, and $v'_4$, respectively. In this embodiment, the sphere visual track v contains two spherical regions (denoted by "$ROI_1$" and "$ROI_2$"). Thus, the second situation mentioned above is met. It should be noted that each of the spherical regions may be an ROI or a viewport, depending upon the actual design considerations. For clarity and simplicity, each of the spherical regions $ROI_1$ and $ROI_2$ has the shape of a rectangle. However, this is for illustrative purposes only, and is not meant to be a limitation of the present invention. As mentioned above, each of the spherical regions $ROI_1$ and $ROI_2$ is defined by its spherical coordinates (e.g., center_yaw and center_pitch) and sizes (e.g., hor_range and ver_range) in a 3D space. In addition, the spherical region $ROI_1$ may be bounded by four great circles (first shape type) as illustrated in FIG. 2, or may be bounded by two yaw circles and two pitch circles (second shape type) as illustrated in FIG. 3. Similarly, the spherical region $ROI_2$ may be bounded by four great circles (first shape type) as illustrated in FIG. 2, or may be bounded by two yaw circles and two pitch circles (second shape type) as illustrated in FIG. 3.

The present invention proposes that the ISOBMFF files F generated from the file encapsulation circuit 118 at the VR service provider end (i.e., source electronic device 102) include a timed metadata track associated with a sphere visual track, and the timed metadata track is set by the file encapsulation circuit 118 to signal that the associated sphere visual track contains multiple spherical regions, each of which is contributed from one or more region visual tracks.

The timed metadata track is signaled to the VR application end (i.e., destination electronic device 104). After the ISOBMFF files F' are received by the file decapsulation circuit 120 at the VR application end (i.e., destination electronic device 104), the timed metadata track is decapsulated from the ISOBMFF files F' to obtain extracted/parsed metadata indicating that multiple spherical regions carried in the associated sphere visual track are contributed from one or more region visual tracks. The metadata signaled by the timed metadata track contain information needed by the following signal processing stages such as video decoder 122 and graphic rendering circuit 124. For example, the file decapsulation circuit 120 decapsulates the ISOBMFF files F' to obtain a part of a coded bitstream and metadata signaled by the timed metadata track. The video decoder 122 decodes the part of the coded bitstream according to at least the extracted/parsed metadata. Specifically, the video decoder 122 accesses and decodes encoded data of visual track(s) of a selected type according to at least the metadata signaled by the timed metadata track. The graphic rendering circuit 124 drives the display screen 126 according to a decoding result of the part of the coded bitstream.

Figure 8:
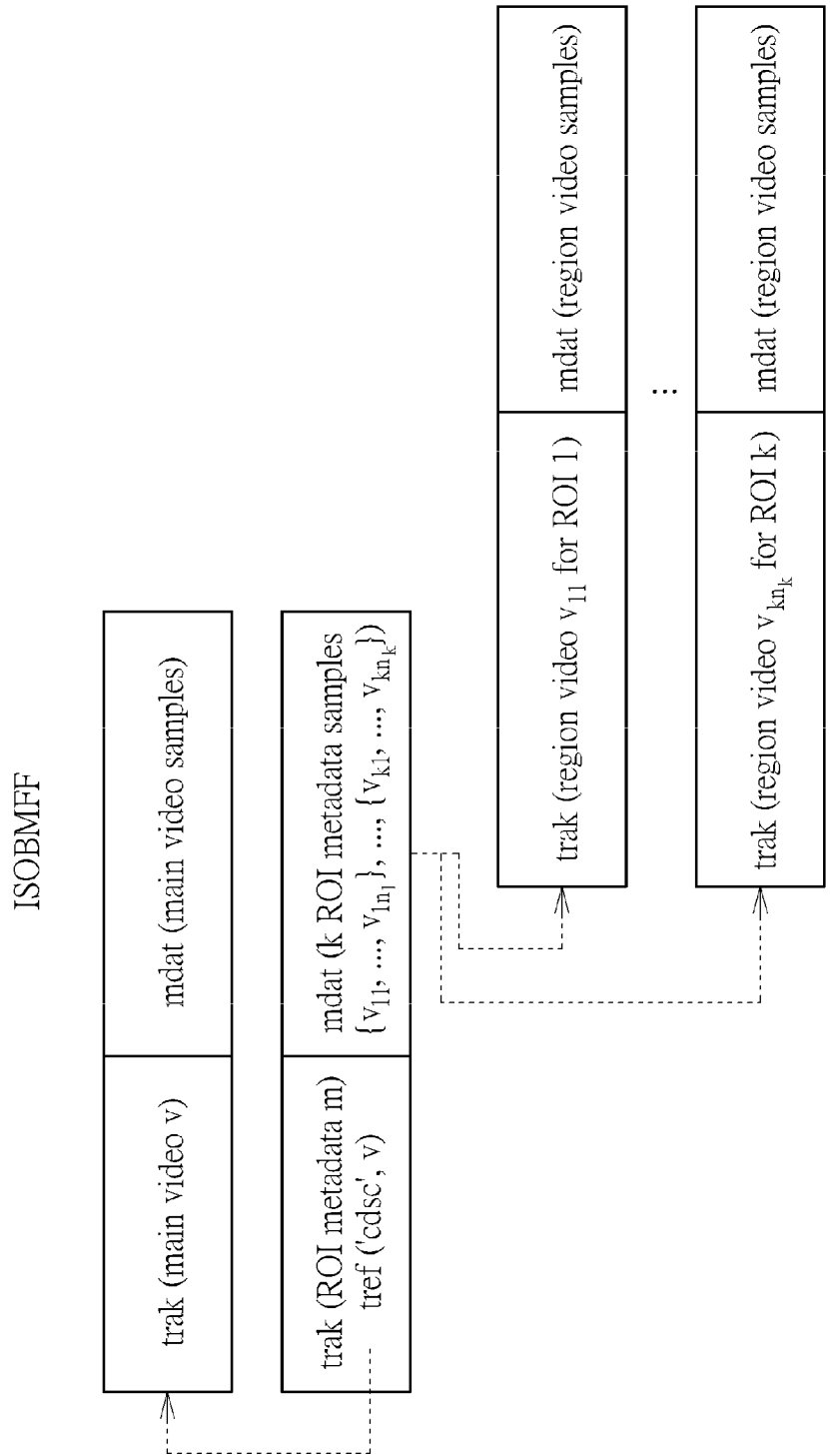
FIG. 8 is a diagram illustrating another timed metadata track that is associated with a sphere visual track and encapsulated in ISOBMFF according to an embodiment of the present invention.

FIG. 8 is a diagram illustrating another timed metadata track that is associated with a sphere visual track and encapsulated in ISOBMFF according to an embodiment of the present invention. The timed metadata track m signals that the referenced (main) sphere visual track v contains a number of spherical regions, each of which is defined by its spherical coordinates (e.g., center_yaw and center_pitch) and sizes (e.g., hor_range and ver_range), identified by a unique spherical region identifier, and contributed by (or carried in) the region visual tracks $v_1, \ldots, v_n$ identified or referenced by respective track identifiers. That is, the timed metadata track m signals the spherical region identifier and spherical coordinates and sizes of each of spherical regions as well as track identifier(s) of region visual track(s). Taking the spherical regions $ROI_1$ and $ROI_2$ shown in FIG. 7 for example, the spherical region $ROI_1$ is contributed by region visual tracks $v'_2$ and $v'_4$, and the spherical region $ROI_1$ is solely contributed by the region visual track $v'_4$. Since there are two spherical regions $ROI_1$ and $ROI_2$ carried in the sphere visual track v, the timed metadata track m shown in FIG. 8 has two sets of ROI metadata samples specifying contributing region visual tracks $\{v_{11} \ldots, v_{1n_1}\}$ and $\{v_{21} \ldots, v_{2n_k}\}$, where k=2. Regarding the first spherical region (i.e., $ROI_1$), the region visual tracks $v_{11}, \ldots, v_{1n_1}$ shown in FIG. 8 are set by $v'_2$ and $v'_4$ (i.e., $\{v_{11} \ldots, v_{1n_1}\}=\{v'_2, v'_4\}$). Regarding the second spherical region (i.e., $ROI_2$), the region visual tracks $v_{21} \ldots, v_{2n_k}$ shown in FIG. 8 are set by $v'_4$ (i.e., $\{v_{21} \ldots, v_{2n_k}\}=\{v'_4\}$ with k=2).

Further details of the second situation in which a sphere visual content contains multiple spherical regions are provided as below.

2. Signaling for a Main Sphere Visual Track Containing Multiple Spherical Regions When a main sphere visual track contains more than one spherical regions that need to be signal, it may be convenient to signal them all together within a single timed metadata track, even though it is possible to use multiple timed metadata tracks, one for each spherical region.

An embodiment of the invention specifies timed metadata for signaling that a (main) sphere visual track contains a number of spherical regions and a number of (spherical or 2D projected) region visual tracks contribute to each of the spherical regions. More specifically, a timed metadata track m signals that the referenced (main) sphere visual track v contains a number of spherical regions, each of which is defined by its spherical coordinates and sizes, identified by a spherical region identifier id, and carried in the region visual tracks $v_1, \ldots, v_n$.

The embodiment disclosed in the rest of this section is built on top of the base definitions of the sample entry and samples in the single spherical region case. Other alternative, enhancement and variation embodiments can be obtained based on the similar alternative, enhanced and variant definitions in the single spherical region case.

2.1 Sample Entry 2.1.1 Syntax

```
class RegionOnSphereSampleEntry extends
MetaDataSampleEntry('rosp') {
    RegionOnSphereConfigBox( ); // mandatory
    Box[ ] other_boxes; // optional
}
class RegionOnSphereConfigBox extends FullBox('rosc', version =
0, flags) {
    unsigned int(8) shape_type;
    bit(7) reserved = 0;
    unsigned int(1) dynamic_range_flag;
    if (dynamic_range_flag == 0) {
        unsigned int(16) static_hor_range;
        unsigned int(16) static_ver_range;
    }
    unsigned int(16) num_spherical_regions;
}
```

2.1.2 Semantics shape_type equal to 1 specifies that the region is specified by four great circles.

shape_type equal to 2 specifies that the region is specified by two yaw circles and two pitch circles.

shape_type values equal to 0 and greater than 1 are reserved.

dynamic_range_flag equal to 0 specifies that the horizontal and vertical ranges of the region remain unchanged in all samples referring to this sample entry. dynamic_range_flag equal to 1 specifies that the horizontal and vertical ranges of the region is indicated in the sample format.

static_hor_range and static_ver_range specify the horizontal and vertical ranges, respectively, of the region for each sample referring to this sample entry in units of 0.01 degrees. static_hor_range and static_ver_range specify the ranges through the center point of the region.

num_spherical_regions specifies the number of spherical regions in the samples referring to this sample entry.

2.2 Sample Format 2.2.1 Syntax

```
aligned(8) RegionOnSphereSample( ) {
    for (j = 1; j <= num_spherical_regions; j++) {
        unsigned int(16)       sr_id;
        signed int(16) center_yaw;
        signed int(16) center_pitch;
        if (shape_type==1 || shape_type==2) {
            unsigned int(16) hor_range;
            unsigned int(16) ver_range;
            unsigned int(16)       num_region_tracks;
            for (i = 1; i <= num_region_tracks; i++) {
                unsigned int(32) track_id;
            }
        }
    }
}
```

2.2.2 Semantics sr_id specifies an identifier of the spherical region. Its value shall be unique with respect to any other spherical regions that the referenced track contains.

center_yaw and center_pitch specify the center point of the region specified in units of 0.01 degrees relative to the global coordinate system. center_yaw shall be in the range of −18000 to 17999, inclusive. center_pitch shall be in the range of −9000 to 9000, inclusive.

hor_range and ver_range, when present, specify the horizontal and vertical ranges, respectively, of the region specified in units of 0.01 degrees. hor_range and ver_range specify the range through the center point of the region.

num_region_tracks specifies the number of region visual tracks whose contents contribute to the spherical region. When it is equal to 0, this implies that there is no (possibly available or known) visual tracks, other than the referenced track containing the spherical region, contributing to it.

track_id specifies an identifier of a region visual track whose content contributes the spherical region. It shall not be equal to the identifier of the referenced (main) sphere visual track.

As shown in FIG. 5, each of region visual tracks $v'_2$ and $v'_4$ contributes to only a single spherical region ROI. Specifically, the region visual track $v'_2$ contributes to an upper portion of the spherical region ROI, and the region visual track $v'_4$ contributes to a lower portion of the spherical region ROI. Thus, the third situation mentioned above is met by each of the region visual tracks $v'_2$ and $v'_4$ shown in FIG. 5.

As shown in FIG. 7, the region visual track $v'_2$ contributes to only a single spherical region $ROI_1$. Specifically, the region visual track $v'_2$ contributes to an upper portion of the spherical region $ROI_1$. Thus, the third situation mentioned above is also met by the region visual track $v'_2$ shown in FIG. 7.

The present invention proposes that the ISOBMFF files F generated from the file encapsulation circuit 118 at the VR service provider end (i.e., source electronic device 102) include a timed metadata track associated with a region visual track, and the timed metadata track is set by the file encapsulation circuit 118 to signal that the associated region visual track contributes to only a single spherical region carried in one sphere visual track. The timed metadata track is signaled to the VR application end (i.e., destination electronic device 104). After the ISOBMFF files F' are received by the file decapsulation circuit 120 at the VR application end (i.e., destination electronic device 104), the timed metadata track is decapsulated from the ISOBMFF files F' to obtain extracted/parsed metadata indicating that the associated region visual track contributes to only a single spherical region carried in one sphere visual track. The metadata signaled by the timed metadata track contain information needed by the following signal processing stages such as video decoder 122 and graphic rendering circuit 124. For example, the file decapsulation circuit 120 decapsulates the ISOBMFF files F' to obtain a part of a coded bitstream and metadata signaled by the timed metadata track. The video decoder 122 decodes the part of the coded bitstream according to at least the extracted/parsed metadata. Specifically, the video decoder 122 accesses and decodes encoded data of visual track(s) of a selected type according to at least the metadata signaled by the timed metadata track. The graphic rendering circuit 124 drives the display screen 126 according to a decoding result of the part of the coded bitstream.

Figure 9:
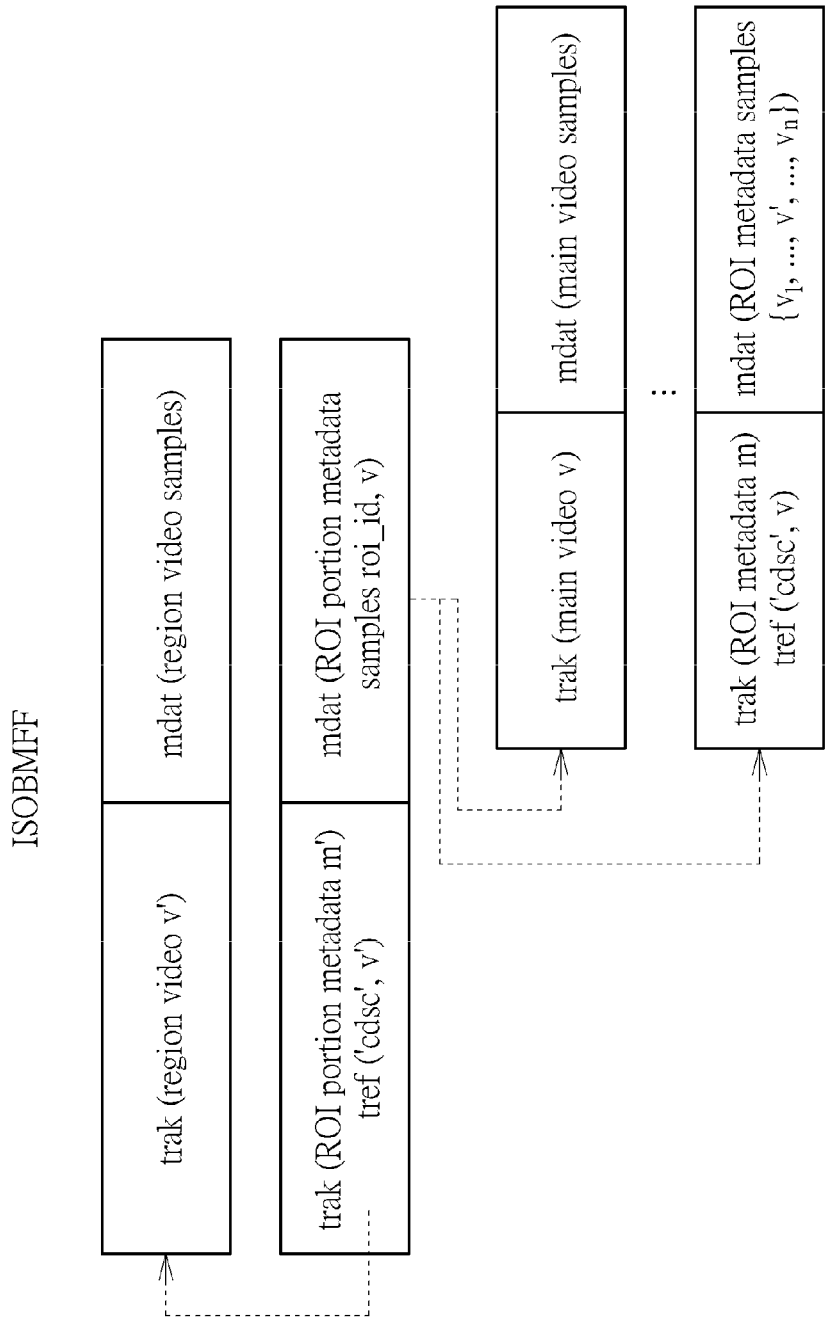
FIG. 9 is a diagram illustrating a timed metadata track that is associated with a region visual track and encapsulated in ISOBMFF according to an embodiment of the present invention.

FIG. 9 is a diagram illustrating a timed metadata track that is associated with a region visual track and encapsulated in ISOBMFF according to an embodiment of the present invention. The timed metadata track m' signals that the referenced region visual track v' contributes to a spherical region, identified by a spherical region identifier (e.g., roi_id), of a (main) sphere visual track v identified or referenced by a track identifier. That is, the timed metadata track m' signals the spherical region identifier of a spherical region as well as the track identifier of the sphere visual track.

The sphere visual track v shown in FIG. 5 has only a single spherical region ROI contributed from the region visual tracks $v'_2$ and $v'_4$. Further, each of the region visual tracks $v'_2$ and $v'_4$ contributes to only a single spherical region. Hence, the region visual track $\{v_1, \ldots, v', \ldots, v_n\}$ shown in FIG. 9 consist of $v'_2$ and $v'_4$ (i.e., $\{v_1, \ldots, v', \ldots, v_n\} = \{v'_2, v'_4\}$, where $v' = v'_2$ or $v'_4$). The ISOBMFF files F/F' includes one metadata track m' signaling that the associated region visual track $v'_2$ ($v' = v'_2$) contributes to the spherical region ROI identified by a spherical region identifier roi_id and carried in the sphere visual track v, and further includes another metadata track m' signaling that the associated region visual track $v'_4$ ($v' = v'_4$) contributes to the same spherical region ROI identified by the spherical region identifier roi_id and carried in the sphere visual track v.

The sphere visual track v shown in FIG. 7 has multiple spherical regions $ROI_1$ and $ROI_2$ contributed from the region visual tracks $v'_2$ and $v'_4$. Further, the region visual track $v'_2$ contributes to only a single spherical region $ROI_1$, and the region visual track $v'_4$ contributes to multiple spherical regions $ROI_1$ and $ROI_2$. Hence, the region visual track $\{v_1, \ldots, v', \ldots, v_n\}$ shown in FIG. 9 consist of $v'_2$ and $v'_4$ (i.e., $\{v_1, \ldots, v', \ldots, v_n\} = \{v'_2, v'_4\}$, where $v' = v'_2$). The ISOBMFF files F/F' includes one metadata track m' signaling that the associated region visual track $v'_2$ ($v' = v'_2$) contributes to the spherical region $ROI_1$ identified by a spherical region identifier roi_id and carried in the sphere visual track v.

Figure 10:
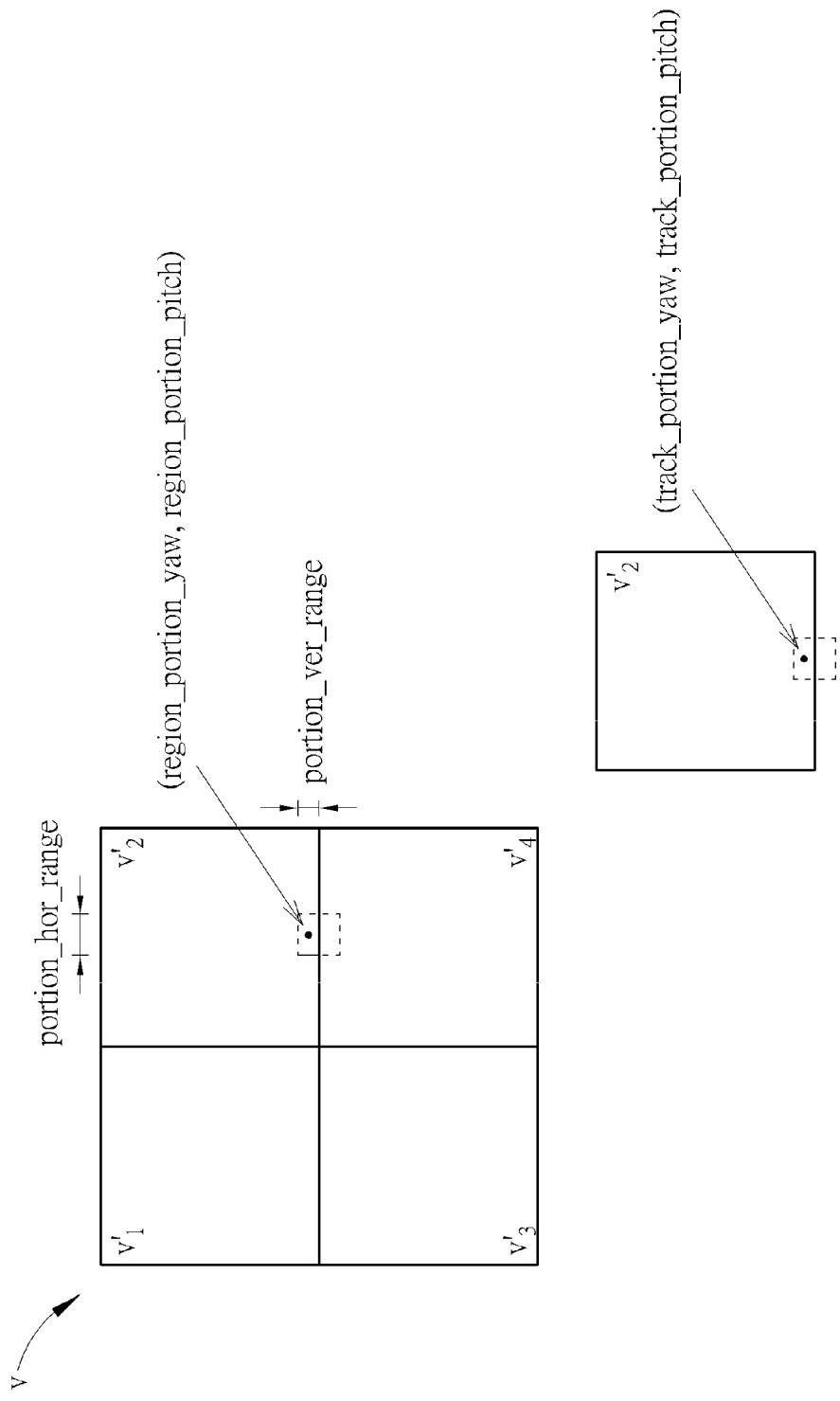
FIG. 10 is a diagram illustrating a contribution portion of a region visual track defined with spherical coordinates and sizes of both a spherical region and the region visual track itself according to an embodiment of the present invention.

The timed metadata track m' associated with the region visual track v' may further define a portion contributed from the region visual track v' by signaling the spherical coordinates and sizes of one or both of the spherical region and the region visual track v' itself. FIG. 10 is a diagram illustrating a contribution portion of a region visual track defined with spherical coordinates and sizes of both a spherical region and the region visual track itself according to an embodiment of the present invention. For clarity and simplicity, FIG. 10 shows a rectangular projected picture of the sphere video content on a 2D plane. Actually, the sphere video content is on a sphere in a 3D space, and may have the shape projected from the sphere. It should be noted that the spherical region with the shape of a rectangle and each spherical region portion with the shape of a rectangle are for illustrative purposes only, and are not meant to be limitations of the present invention. In addition, the spherical region may be bounded by four great circles (first shape type) as illustrated in FIG. 2, or may be bounded by two yaw circles and two pitch circles (second shape type) as illustrated in FIG. 3.

As mentioned above, the region visual track $v'_2$ in FIG. 5 contributes to only a single spherical region (particularly, an upper portion of the spherical region ROI). The upper portion of the spherical region ROI contributed from the region visual track $v'_2$ is specified in a metadata track associated with the region visual track $v'_2$. In some embodiments of the present invention, the timed metadata track m' associated with the region visual track v' (e.g., $v'_2$) specifies a portion of a spherical region (e.g., upper portion of spherical region ROI) to which the region visual track v' contributes, with respect to the spherical coordinates and sizes of the spherical region. For example, the timed metadata track m' is set to signal spherical coordinates (e.g., region_portion_yaw and region_portion_pitch) and sizes (e.g., region_hor_range and region_ver_range) of the portion of the spherical region to which the associated region visual track v' (e.g., v'$_2$) contributes, with respect to spherical coordinates and sizes of the spherical region.

In some embodiments of the present invention, the timed metadata track m' associated with the region visual track v' (e.g., v'$_2$) may further specify the portion of the spherical region (e.g., upper portion of spherical region ROI) to which the region visual track v' contributes, with respect to the spherical coordinates and sizes of the region visual track v' itself. For example, the timed metadata track m' is set to further signal spherical coordinates (e.g., track_portion_yaw and track_portion_pitch) of the portion of the spherical region to which the associated region visual track v' (e.g., v'$_2$) contributes, with respect to spherical coordinates and sizes of the portion on a region of the associated region visual track v' (e.g., v'$_2$).

Further details of the third situation in which a region visual content contributing to a single spherical region are provided as below.

3. Signaling for a Region Video Track Contributing to a Single Spherical Region

An embodiment of the invention specifies timed metadata track for signaling that a (spherical or projected 2D) region visual track contributes a portion to a single spherical region. More specifically, a timed metadata track m' signals that the referenced region visual track v' contributes to a spherical region, identified by a spherical region identifier id, of a (main) sphere visual track v, and the portion contributed from v' is defined with the spherical coordinates and sizes of both the spherical region and the track v' itself.

More embodiments can be obtained based on optimization, enhancement and variation can be obtained with considerations to the ones for signaling a main spherical visual track containing a single spherical region, such as the spherical region being static, and the contributed portion is time invariant.

3.1 Sample Entry
3.1.1 Syntax

Sample Entry Type: 'regn'
Container:      Sample Description Box ('stsd')
Mandatory:      No
Quantity: 0 or 1
class RegionContributionSampleEntry extends
MetaDataSampleEntry('regn') {
    unsigned int(8) shape_type;
    bit(7) reserved = 0;
    unsigned int(1) dynamic_range_flag;
    if (dynamic_range_flag == 0) {
        unsigned int(16) static_hor_range;
        unsigned int(16) static_ver_range;
    }
}

3.1.2 Semantics shape_type equal to 1 specifies that the region is specified by four great circles.

shape_type equal to 2 specifies that the region is specified by two yaw circles and two pitch circles.

shape_type values equal to 0 and greater than 1 are reserved.

dynamic_range_flag equal to 0 specifies that the horizontal and vertical ranges of the region remain unchanged in all samples referring to this sample entry. dynamic_range_flag equal to 1 specifies that the horizontal and vertical ranges of the region is indicated in the sample format.

static_hor_range and static_ver_range specify the horizontal and vertical ranges, respectively, of the region for each sample referring to this sample entry in units of 0.01 degrees. static_hor_range and static_ver_range specify the ranges through the center point of the region.

3.2 Sample Format
3.2.1 Syntax aligned(8) class RegionContributionSample( ){
    unsigned int(16) sr_id;
    unsigned int(32) track_id;
    unsigned int(16) region_portion_yaw;
    unsigned int(16) region_portion_pitch;
    unsigned int(16) portion_hor_range;
    unsigned int(16) portion_ver_range;
    unsigned int(16) track_portion_yaw;
    unsigned int(16) track_portion_pitch;
}

3.2.2 Semantics sr_id specifies an identifier of the spherical region. Its value shall be unique with respect to any other spherical regions that the referenced track contains.

track_id specifies an identifier of a main sphere visual track that contains the spherical region.

region_portion_yaw and region_portion_pitch specify the center point of the portion on the spherical region the referenced track is to contribute.

portion_hor_range and portion_ver_range specify the horizontal and vertical ranges, respectively, of the portion the referenced track is to contribute, specified in units of 0.01 degrees. portion_hor_range and portion_ver_range specify the range through the center point of the portion.

track_portion_yaw and track_portion_pitch specify the center point of the portion on the region of the referenced track is to contribute.

As shown in FIG. 7, the region visual track v'$_4$ contributes to multiple spherical regions ROI$_1$ and ROI$_2$. Specifically, the region visual track v'$_4$ contributes to a lower portion of the spherical region ROI$_1$, and also contributes to the whole spherical region ROI$_2$. Thus, the fourth situation mentioned above is met by the region visual track v'$_4$ shown in FIG. 7. The present invention proposes that the ISOBMFF files F generated from the file encapsulation circuit 118 at the VR service provider end (i.e., source electronic device 102) include a timed metadata track associated with a region visual track, and the timed metadata track is set by the file encapsulation circuit 118 to signal that the associated region visual track contributes to multiple spherical regions carried in one or more sphere visual tracks. The timed metadata track is signaled to the VR application end (i.e., destination electronic device 104). After the ISOBMFF files F' are received by the file decapsulation circuit 120 at the VR application end (i.e., destination electronic device 104), the timed metadata track is decapsulated from the ISOBMFF files F' to obtain extracted/parsed metadata indicating that the associated region visual track contributes to multiple spherical regions carried in one or more sphere visual tracks. The metadata signaled by the timed metadata track contain information needed by the following signal processing stages such as video decoder 122 and graphic rendering circuit 124. For example, the file decapsulation circuit 120 decapsulates the ISOBMFF files F' to obtain a part of a coded bitstream and metadata signaled by the timed metadata track. The video decoder 122 decodes the part of the coded bitstream according to at least the extracted/parsed metadata. Specifically, the video decoder 122 accesses and decodes encoded data of visual track(s) of a selected type according to at least the metadata signaled by the timed metadata track. The graphic rendering circuit 124 drives the display screen 126 according to a decoding result of the part of the coded bitstream.

Figure 11:
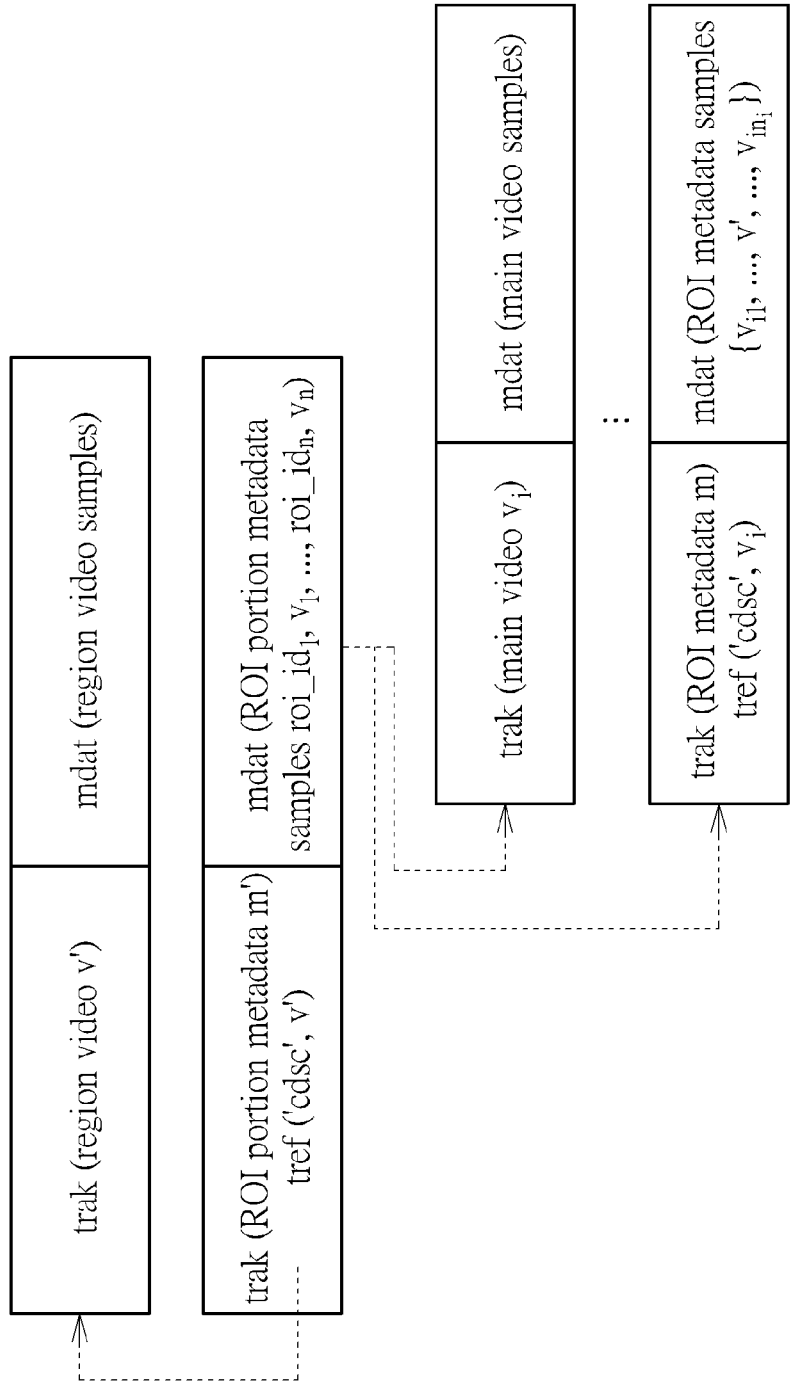
FIG. 11 is a diagram illustrating another timed metadata track that is associated with a region visual track and encapsulated in ISOBMFF according to an embodiment of the present invention.

FIG. 11 is a diagram illustrating another timed metadata track that is associated with a region visual track and encapsulated in ISOBMFF according to an embodiment of the present invention. The timed metadata track m' signals that the referenced region visual track v' contributes to a number of spherical regions. The sphere visual track v shown in FIG. 7 has multiple spherical regions $ROI_1$ and $ROI_2$ contributed from the region visual tracks $v'_2$ and $v'_4$. Further, the region visual track $v'_2$ contributes to only a single spherical region, and the region visual track $v'_4$ contributes to multiple spherical regions.

In a first case, the spherical regions contributed by the same region visual track v' are carried in the same sphere visual track v. Hence, the $1^{st}$ spherical region identified by the $1^{st}$ spherical region identifier $roi\_id_1$ and carried in the $1^{st}$ sphere visual track $v_1$ as shown in FIG. 11 is the spherical regions $ROI_1$ carried in the sphere visual track v shown in FIG. 7, where $v_1 = v$; and the $n^{th}$ spherical region identified by the $n^{th}$ spherical region identifier $roi\_id_n$ and carried in the $n^{th}$ sphere visual track $v_n$ as shown in FIG. 11 is the spherical regions $ROI_2$ carried in the sphere visual track v shown in FIG. 7, where $v_n = v$. Since the sphere visual track $v_i$ selected from $\{v_1, \ldots, v_n\}$ is the sphere visual track v, the region visual tracks $\{v_{i1}, \ldots, v', \ldots, v_{in_j}\}$ shown in FIG. 11 consist of $v'_4$ only (i.e., $\{v_{i1}, \ldots, v', \ldots, v_{in_j}\} = \{v'_4\}$, where $v' = v'_4$). The ISOBMFF files F/F' includes one metadata track m' signaling that the associated region visual track $v'_4$ ($v' = v'_4$) contributes to the spherical region $ROI_1$ identified by a spherical region identifier $roi\_id_1$ and carried in the sphere visual track v identified or referenced by a track identifier, and further contributes the spherical region $ROI_2$ identified by a spherical region identifier $roi\_id_2$ and carried in the sphere visual track v identified or referenced by the track identifier. That is, the timed metadata track m' signals spherical region identifiers of spherical regions as well as the track identifier of the sphere visual track.

In a second case, the spherical regions contributed by the same region visual track v' may be carried in different sphere visual tracks $\{v_1, \ldots, v_n\}$ corresponding to sphere visual contents on different spheres, where $v_1 \neq v_n$. Hence, for any sphere visual track $v_1$ selected from $\{v_1, \ldots, v_n\}$, it may include a spherical region contributed by the region visual track v'. Hence, the ISOBMFF files F/F' includes one metadata track m' signaling that the associated region visual track v' contributes to spherical regions identified by different spherical region identifiers $\{roi\_id_1, \ldots, roi\_id_n\}$ and carried in different sphere visual tracks $\{v_1, \ldots, v_n\}$ identified or referenced by respective track identifiers, respectively. That is, the timed metadata track m' signals spherical region identifiers of spherical regions as well as track identifiers of sphere visual tracks.

Further, for each contributed spherical region identified by a spherical region identifier $\{roi\_id_1, \ldots, roi\_id_n\}$ and carried in a (main) sphere visual track $\{v_1, \ldots, v_n\}$ in any of the aforementioned cases, a portion contributed from a region visual track v' is defined with the spherical coordinates and sizes of one or both of the spherical region and the region visual track v' itself, as illustrated in FIG. 10. That is, the timed metadata track m' associated with the region visual track v' may specify a portion of a spherical region to which the region visual track v' contributes, with respect to the spherical coordinates and sizes of the spherical region, and may further specify the portion of the spherical region to which the region visual track v' contributes, with respect to the spherical coordinates and sizes of the region visual track v' itself.

Further details of the fourth situation in which a region visual content contributing to multiple spherical regions are provided as below.

4. Signaling for a Region Video Track Contributing to Multiple Spherical Regions When a region visual track contributes more than one spherical regions, it can be more compact and convenient to signal these spherical regions all together within a single timed metadata track, even though it is possible to use multiple timed metadata tracks associated with the same region visual track, one for each spherical region.

An embodiment of the invention specifies timed metadata for signaling that a (spherical or 2D projected) region visual track contributes to a number of spherical regions. More specifically, a timed metadata track m' signals that the referenced region visual track v' contributes to a number of spherical regions, and for each contributed spherical region identified by a spherical region identifier id, of a (main) sphere visual track v, the portion contributed from v' is defined with the spherical coordinates and size of both the spherical region and the track v' itself.

4.1 Sample Entry 4.1.1 Syntax

```
Sample Entry Type: 'regn'
Container:          Sample Description Box ('stsd')
Mandatory:          No
Quantity: 0 or 1
class RegionContributionSampleEntry extends
MetaDataSampleEntry('regn') {
    unsigned int(8) shape_type;
    bit(7) reserved = 0;
    unsigned int(1) dynamic_range_flag;
    if (dynamic_range_flag == 0) {
        unsigned int(16) static_hor_range;
        unsigned int(16) static_ver_range;
    }
    unsigned int(16) num_spherical_regions;
}
```

4.1.2 Semantics shape_type equal to 1 specifies that the region is specified by four great circles.

shape_type equal to 2 specifies that the region is specified by two yaw circles and two pitch circles.

shape_type values equal to 0 and greater than 1 are reserved.

dynamic_range_flag equal to 0 specifies that the horizontal and vertical ranges of the region remain unchanged in all samples referring to this sample entry. dynamic_range_flag equal to 1 specifies that the horizontal and vertical ranges of the region is indicated in the sample format.

static_hor_range and static_ver_range specify the horizontal and vertical ranges, respectively, of the region for each sample referring to this sample entry in units of 0.01 degrees. static_hor_range and static_ver_range specify the ranges through the center point of the region.

num_spherical_regions specifies the number of spherical regions in the samples referring to this sample entry.

4.2 Sample Format
4.2.1 Syntax

```
aligned(8) class RegionContributionSample( ){
    unsigned int(16) num_contributed_spherical_regions;
    for (i = 1; i <= num_contributed_spherical_regions;
    i++) {
        unsigned int(16) sr_id;
        unsigned int(32) track_id;
        unsigned int(16) region_portion_yaw;
        unsigned int(16) region_portion_pitch;
        unsigned int(16) portion_hor_range;
        unsigned int(16) portion_ver_range;
        unsigned int(16) track_portion_yaw;
        unsigned int(16) track_portion_pitch;
    }
}
```

4.2.2 Semantics num_contributed_spherical_regions specifies a number of spherical regions the associated media sample contribute its content to.

sr_id specifies an identifier of the spherical region. Its value shall be unique with respect to any other spherical regions that the referenced track contains.

track_id specifies an identifier of a main sphere visual track that contains the spherical region.

region_portion_yaw and region_portion_pitch specify the center point of the portion on the spherical region the referenced track is to contribute.

portion_hor_range and portion_ver_range specify the horizontal and vertical ranges, respectively, of the portion the referenced track is to contribute, specified in units of 0.01 degrees. portion_hor_range and portion_ver_range specify the range through the center point of the portion.

track_portion_yaw and track_portion_pitch specify the center point of the portion on the region of the referenced track is to contribute.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A video processing method comprising:
receiving a virtual reality (VR) content;
encoding visual data obtained from the VR content to generate a part of a coded bitstream; and
encapsulating, by a file encapsulation circuit, the part of the coded bitstream into at least one ISO Base Media File Format (ISOBMFF) file, wherein said at least one ISOBMFF file comprises a timed metadata track associated with a sphere visual track, and the timed metadata track is set to signal that the associated sphere visual track contains at least one spherical region contributed from at least one region visual track.

2. A video processing method comprising:
receiving at least one ISO Base Media File Format (ISOBMFF) file, wherein virtual reality (VR) content is delivered by said at least one ISOBMFF file, said at least one ISOBMFF file comprises a timed metadata track associated with a sphere visual track, and the timed metadata track signals that the associated sphere visual track contains at least one spherical region contributed from at least one region visual track;
decapsulating said at least one ISOBMFF file to obtain a part of a coded bitstream and metadata signaled by the timed metadata track;
decoding the part of the coded bitstream according to at least the metadata; and
driving a display screen according to a decoding result of the part of the coded bitstream.

3. The video processing method of claim 2, wherein the timed metadata track is set to further signal a spherical region identifier of each of said at least one spherical region and a track identifier of each of said at least one region visual track.

4. The video processing method of claim 2, wherein the timed metadata track is set to further signal spherical coordinates and sizes of each of said at least one spherical region.

5. The video processing method of claim 2, wherein the associated sphere visual track contains only a single spherical region, and the timed metadata track signals that the single spherical region is carried in said at least one region visual track.

6. The video processing method of claim 5, wherein a number of said at least one region visual track is larger than one.

7. The video processing method of claim 2, wherein the associated sphere visual track contains multiple spherical regions, and the timed metadata track signals that the multiple spherical regions are carried in a plurality of region visual tracks, where each of said multiple spherical regions is carried in at least one of the plurality of region visual tracks.

8. The video processing method of claim 7, wherein a number of said at least one of the plurality of region visual tracks is larger than one.

9. The video processing method of claim 7, wherein the plurality of region visual tracks are associated with a plurality of timed metadata tracks, respectively.

10. A video processing method comprising:
receiving at least one ISO Base Media File Format (ISOBMFF) file, wherein virtual reality (VR) content is delivered by said at least one ISOBMFF file, said at least one ISOBMFF file comprises a timed metadata track associated with a region visual track, and the timed metadata track signals that the associated region visual track contributes to at least one spherical region carried in at least one sphere visual track;
decapsulating said at least one ISOBMFF file to obtain a part of a coded bitstream and metadata signaled by the timed metadata track; and
decoding the part of the coded bitstream according to the metadata; and
driving a display screen according to a decoding result of the part of the coded bitstream.

11. The video processing method of claim 10, wherein the timed metadata track is set to further signal a spherical region identifier of each of said at least one spherical region and a track identifier of each of said at least one sphere visual track.

12. The video processing method of claim 10, wherein the timed metadata track is set to further signal spherical coordinates and sizes of a portion of each of said at least one spherical region to which the associated region visual track contributes, with respect to spherical coordinates and sizes of said each of said at least one spherical region.

13. The video processing method of claim 10, wherein the timed metadata track further is set to further signal spherical coordinates of a portion of each of said at least one spherical region to which the region visual track contributes, with respect to spherical coordinates and sizes of said portion on a region of the associated region visual track.

14. The video processing method of claim 10, wherein the associated region visual track contributes to only a single spherical region.

15. The video processing method of claim 10, wherein the associated region visual track contributes to multiple spherical regions.

16. The video processing method of claim 15, wherein the multiple spherical regions comprise spherical regions that are carried in different sphere visual tracks corresponding to different spheres, respectively.

17. A video processing apparatus comprising:
a file decapsulation circuit, arranged to receive at least one ISO Base Media File Format (ISOBMFF) file, and decapsulate said at least one ISOBMFF file to obtain a part of a coded bitstream and metadata signaled by a timed metadata track, wherein virtual reality (VR) content is delivered by said at least one ISOBMFF file, said at least one ISOBMFF file comprises the timed metadata track associated with a sphere visual track, and the timed metadata track signals that the associated sphere visual track contains at least one spherical region contributed from at least one region visual track;
a video decoder, arranged to decode the part of the coded bitstream according to the metadata; and
a graphic rendering circuit, arranged to drive a display screen according to a decoding result of the part of the coded bitstream.

\* \* \* \* \*